Oct. 26, 1948.  C. H. BEARE  2,452,284
INJECTION OF BRAKE LININGS
Filed Jan. 11, 1946  5 Sheets-Sheet 1

INVENTOR
CHARLES H. BEARE
BY
Spencer Hardman & Fehr
ATTORNEYS

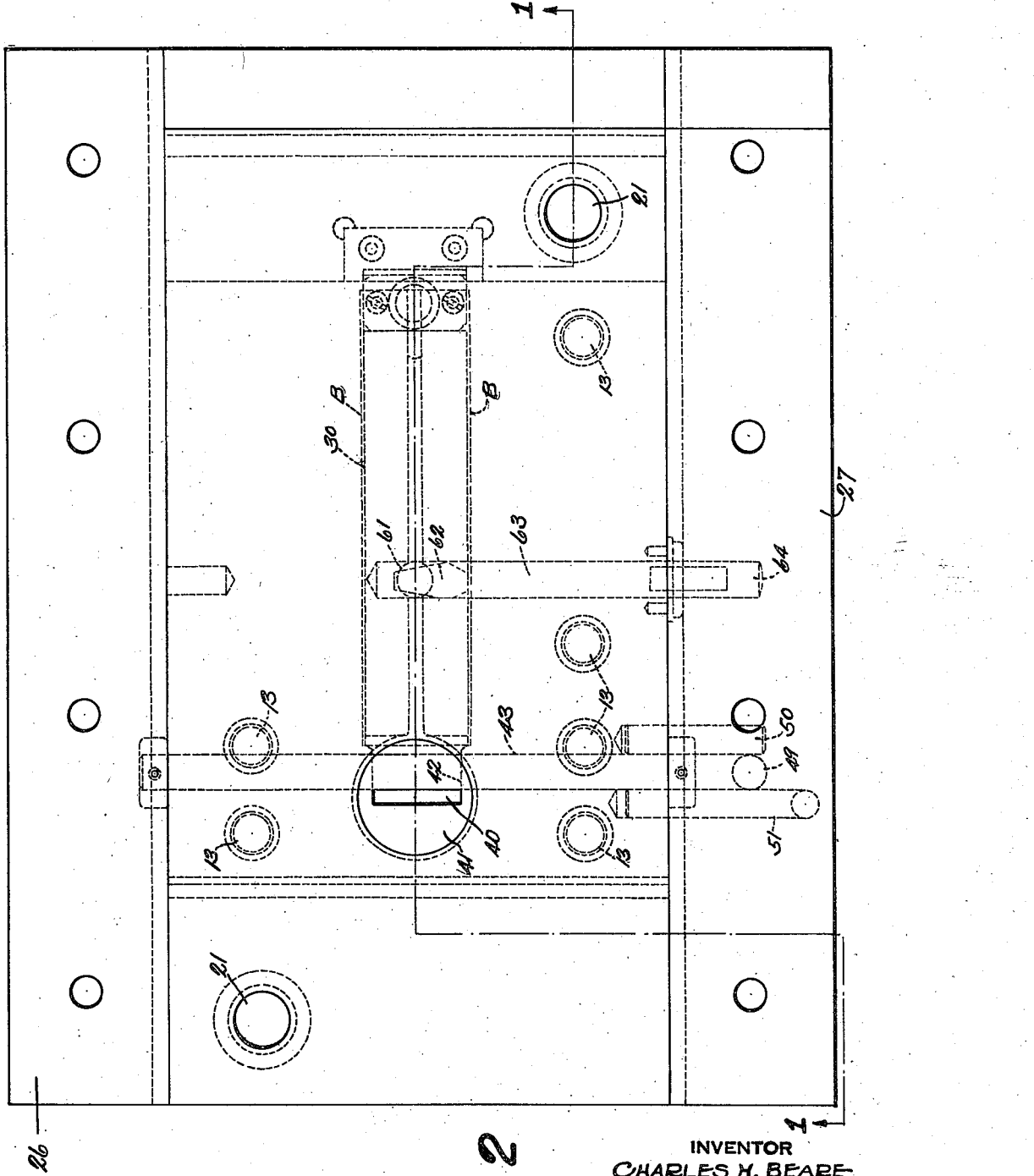

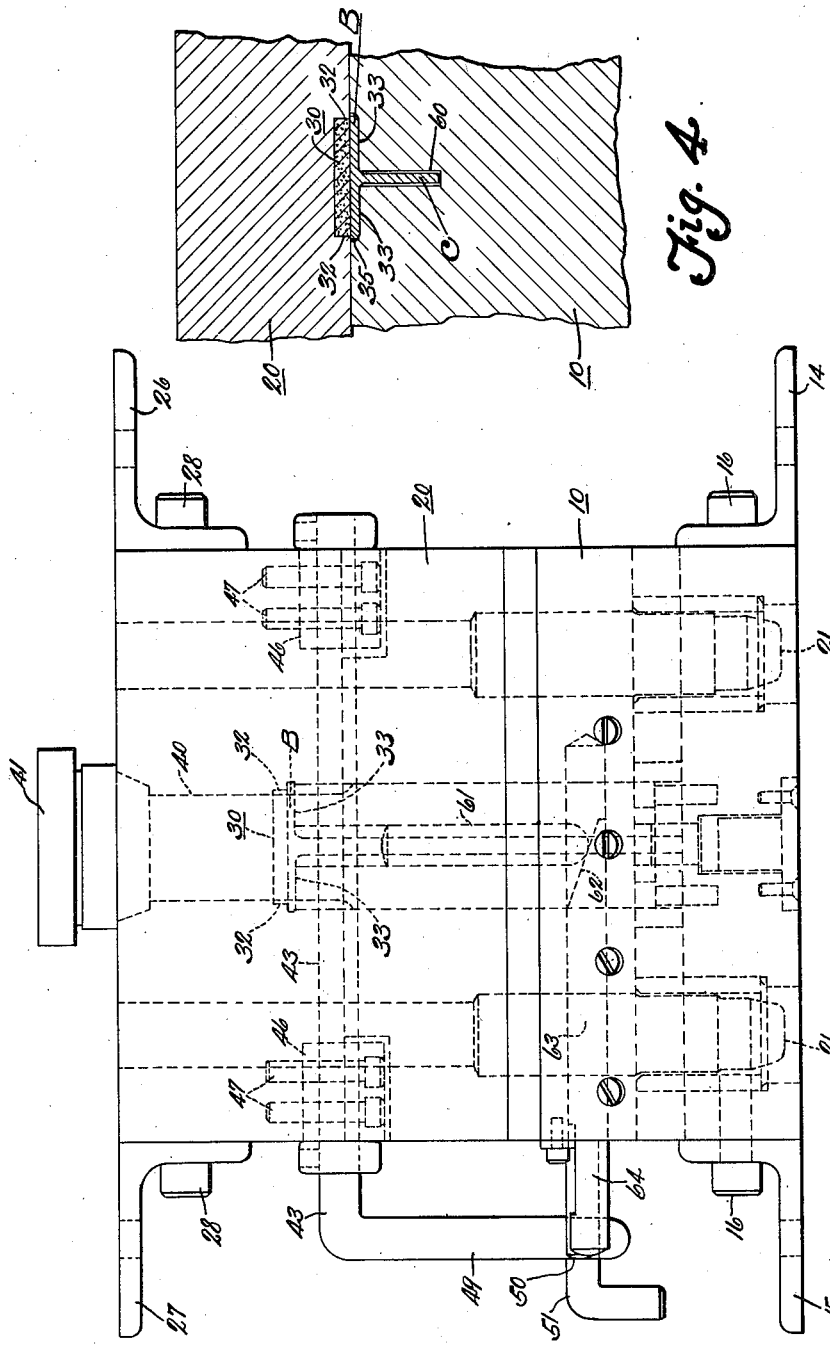

Oct. 26, 1948.                    C. H. BEARE                  2,452,284
                          INJECTION OF BRAKE LININGS
Filed Jan. 11, 1946                                     5 Sheets-Sheet 4
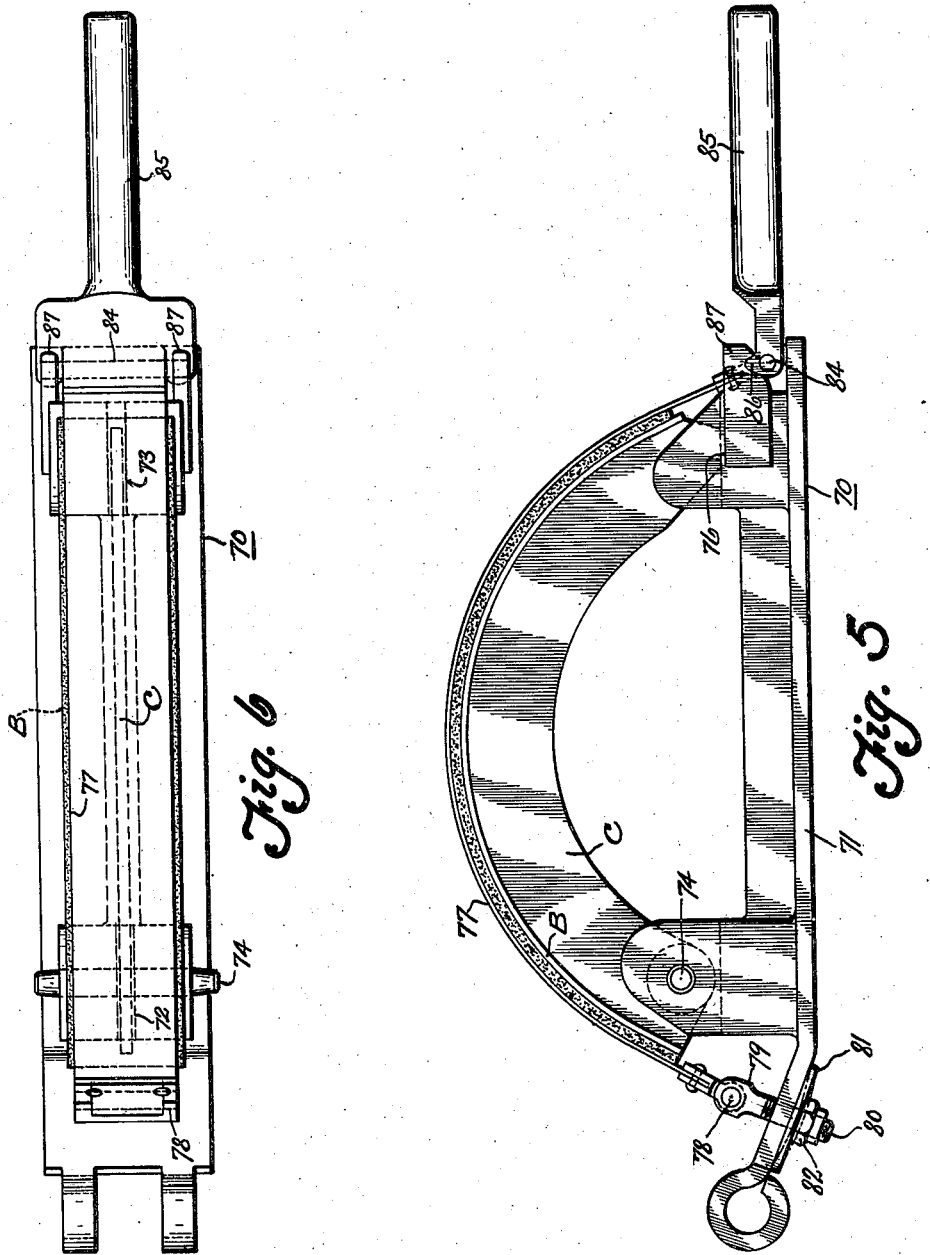
INVENTOR
CHARLES H. BEARE
BY
Spencer, Hardman & Fehr
his ATTORNEYS Oct. 26, 1948.   C. H. BEARE   2,452,284
INJECTION OF BRAKE LININGS
Filed Jan. 11, 1946   5 Sheets-Sheet 5

INVENTOR
CHARLES H. BEARE
BY
Spencer Hardman & John
his ATTORNEYS

Patented Oct. 26, 1948

2,452,284

UNITED STATES PATENT OFFICE 2,452,284

INJECTION OF BRAKE LININGS

Charles H. Beare, Dayton, Ohio, assignor to General Motors Corporation, Detroit, Mich., a corporation of Delaware Application January 11, 1946, Serial No. 640,622

5 Claims. (Cl. 18—47.5)

1

This invention relates to a method of making brake shoes having a molded friction lining molded in situ thereon.

An object of this invention is to provide an efficient apparatus and method of making brake shoes suitable for automotive vehicles by injecting a thermosetting friction compound directly onto a metal brake shoe with such high pressure as to highly compact the lining material in situ on the metal flange of the shoe, and thereafter curing said lining under a mechanical follow-up compacting means which will reduce porosity and provide high density and hardness in the final cured lining.

In developing the process of this invention many problems were encountered due primarily to the inherent nature of the thermosetting fibrous compounds which are adapted for making friction brake linings suitable for automotive vehicles. For instance, such compounds can be rendered sufficiently plastic for the purposes of this invention only by mixing therewith a suitable volatile solvent which will permit the compound to flow and be compacted to a uniform degree thruout the length of the molded lining. Such volatile solvent will be evaporated later on when the molded lining is subjected to a curing temperature and this tends to reduce the density of the lining and cause porosity therein. By following the method of this invention such reduction of density is avoided and the final cured linings will possess adequate density and hardness for use as brake linings for automotive vehicles.

According to this invention the thermosetting friction compound is in the first place injected into the brake lining cavity in a mold under such a tremendous pressure that the amount of solvent needed in the compound to provide sufficient flow in the mold is greatly lessened. In the second place, care is taken to evaporate all the solvent from the molded lining prior to subjecting said lining to such a high temperature as will cause the thermosetting binder therein to stiffen due to a partial cure, and while said solvent is being evaporated the molded lining is maintained compacted under a follow-up mechanical pressure which will progressively compact the lining and prevent the voids therein which would otherwise result due to the escape of the solvent from the molded lining. Only after the solvent is fully evaporated is the molding lining subjected to such a high temperature as will cause the thermosetting binder to set up and thereby greatly increase the hardness and rigidity thereof.

As stated above, tremendous pressures are used

2 to inject the compound into the brake lining cavity in the mold. When the compound is injected directly onto the metal flange of a brake shoe which is inserted into the mold, such tremendous pressure necessarily comes directly against the outer surface of the metal flange of the brake shoe. Now if the area of this flange surface which receives this high pressure is say 2 inches by 15 inches, or 30 sq. inches, and the injecting pressure is say 15,000 lbs. per sq. in., then the total force on the flange surface will approach 450,000 lbs. When the injecting pressure is 30,000 lbs. per sq. inches the total force will approach 900,000 lbs. Such a great force against the metal flange will distort same or force it out of its proper location in the mold unless means are carefully devised to very rigidly back up said flange to prevent distortion thereof and to maintain its proper location relative to the lining cavity. Also the lining cavity must be sealed along the edges of said metal flange to prevent escape of the injected material. When such sealing is done by a close fit between the edges of said flange and the adjacent walls of the mold cavity the above-mentioned great total force against said flange will often cause the flange to be wedged tight within the mold and hence cause serious difficulties in removing the shoe from the mold. All these problems were solved by the method and apparatus of this invention, as will appear herein in the detailed description.

Further objects and advantages of the present invention will be apparent from the following description, reference being had to the accompanying drawings wherein a preferred embodiment of the present invention is clearly shown.

In the drawings:

Figs. 1 to 4 are views of the injection mold in which the plastic lining compound is injected under an extremely high pressure and molded in situ against the metal flange of a brake shoe.

Fig. 1 is a vertical section thru the mold taken on line 1—1 of Fig. 2, and shows the molded lining and brake shoe located in the mold cavity.

Fig. 2 is a plan view of the mold.

Fig. 3 is an end view looking in the direction of arrow 3 of Fig. 1.

Fig. 4 is a section on line 4—4 of Fig. 1, and shows how the metal flange of the brake shoe is rigidly backed up to receive the high molding pressure thereupon.

Figs. 5, 6 and 7 show the clamping fixture used for mechanically clamping the molded lining against the shoe while the solvent is being evaporated therefrom.

Fig. 5 is a side elevation showing the molded lining tightly clamped upon the brake shoe with a follow-up force.

Fig. 6 is a plan view of Fig. 5.

Fig. 7 illustrates the operation of the clamping fixture.

Similar reference characters refer to similar parts throughout the drawings.

Figure 1:
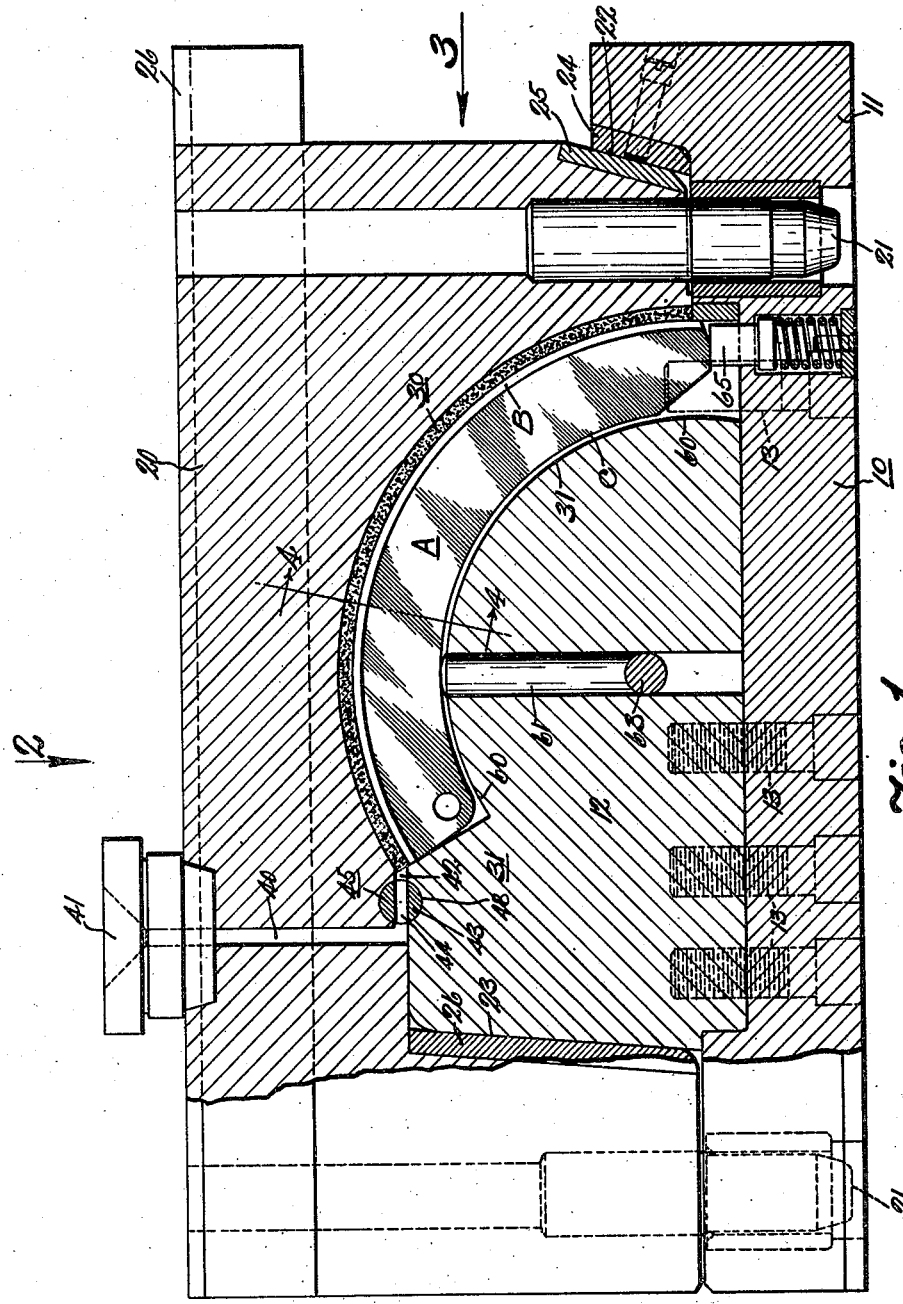

The mold illustrated in Figs. 1 to 4 inclusive divides into upper and lower sections along a line extending flush with the outer surface of the curved flange B of the metal brake shoe A. The strong and heavy lower mold section 10 may be made up of any desired number of separate parts which are suitably screwed or otherwise rigidly fixed together, but for clarity of illustration in the drawings, the lower mold section 10 is shown as comprising a heavy base 11 rigidly bolted to the cavity-forming part 12 by screws 13. The relatively reciprocable upper mold section 20 fits accurately upon lower section 10 and is guided by the guide pins 21 when the mold is being closed. When upper section 20 is pressed home to fully close the mold cavity as shown in Fig. 1 the inclined engaging surfaces 22 and 23 precisely locate the two mold sections. Hardened steel wear plates 24 and 25 are fixed respectively to lower section 10 and upper section 20. Also hardened steel wear plate 26 is fixed to upper section 20 by suitable screws with counter-sunk heads (not shown). Lower section 10 has two heavy metal flanges 14 and 15, rigidly fixed thereto by bolts 16, by which the lower section 10 may be rigidly bolted down upon the lower platen of the hydraulic press used to open and close the mold. Similarly the upper mold section 20 has two heavy flanges, rigidly fixed thereto by bolts 28, by which said upper section may be rigidly bolted to the upper reciprocatable platen of the hydraulic press.

The portion 30 of the mold cavity for receiving the injected lining compound is formed in the upper mold section 20. The remaining portion 31 of the mold cavity is formed in the lower mold section 10 and within which the metal brake shoe A is accurately located so that its metal flange B forms a confining wall to the lining cavity portion 30, as clearly shown in Fig. 4. When the mold sections are forced closed by the hydraulic press the marginal edges of metal flange B extend laterally slightly beyond both lateral edges of cavity portion 30, as shown at 32 in Fig. 4, so that the marginal edges of flange B is squeezed between upper mold section 20 and the solid backing up portion 33 of lower mold section 10. Thus the lining compound when injected at very high pressure into the lining cavity 30 is sealed against escape around the edges of flange B by the high pressure of portions 32 of the upper section 20 directly against the outside marginal surface of flange B. Due to the outline curvature of flange B, as seen in Fig. 1, the directly vertical closing pressure between the upper and lower mold sections will be far from perpendicular to the downwardly curved portion of flange B at the right side of Fig. 1, so that this downwardly curved portion of flange B will not ordinarily be squeezed sufficiently tight between the two mold sections to properly seal the lining compound in cavity 30 in the manner described. Now in order to insure such proper sealing, the above described inclined engaging surfaces 22 and 23 between the two mold sections 10 and 20 are provided so that when the upper section 20 is pressed home to closed position said engaging surfaces 22 and 23 will urge said upper section laterally toward the left as viewed in Fig. 1, and so cause upper mold section 20 to be forced very tightly against flange B throughout its length. Inclined surfaces 22 and 23 also sustain the resultant force between the two mold sections tending to shift the upper mold section 20 to the right (as viewed in Fig. 1) when the compound is injected into its cavity 30 at the high injection pressure used. The sealing of the compound in lining cavity 30 by maintaining the marginal edges of flange B tightly squeezed between the two mold sections, as described above, is an important feature of this invention. By using this method of sealing the flange B will not become tightly wedged in place in either of the mold sections by the very high pressure thereupon. Hence as soon as the mold sections 10 and 20 are separated after completing a molding operation the entire brake shoe with its molded lining still adhering thereto may be easily ejected from the mold cavity 31 by suitable knock out pins.

The injection of the lining compound into lining cavity 30 will now be described. Upper mold section 20 has a rectangular passage 40 leading down from the funnel-shaped injection inlet 41 into which the plastic compound is injected under high pressure while the two mold sections 10 and 20 are held forced together by the hydraulic press. Passage 40 leads straight down to the line of separation of the two mold sections and there connects with the short horizontal passage 42 which is also rectangular in cross section and leads directly into one end of the lining cavity 30 (see Fig. 1).

A cut-off valve 45 is provided in passage 42 by a rotatable stem 43 having a rectangular aperture 44 therein of the same dimensions as passage 42 so that when valve 45 is in full open position as illustrated in Fig. 1 passage 42 is not restricted thereby. Rotatable stem 43 is mounted in two opposed bearings 46 fixed to the upper mold section 20 by screws 47, hence when the mold sections are separated stem 43 will be lifted from its snugly fitting recess 48 in lower mold section 10. When the mold sections are separated the short passage 42 has no bottom wall as is obvious from Fig. 1. This structure greatly facilitates cleaning of passages 40, 42, and 44, if and when it becomes necessary to remove compound from these inlet passages. Rotatable stem 43 may be manually rotated by its crank 49 to open or close valve 45. Valve 45 is maintained in fully open position when crank 49 depends vertically and its lower end is retained between the projecting fixed pin 50 and removable pin 51, as shown in Figs. 2 and 3.

In the molding operation, the mold sections 10 and 20 are separated and the metal brake shoe A is inserted in place in the lower section 10 so that its flange B lies snugly within its recess 35 as shown in Fig. 4, and its web portion C lies in narrow vertical recess 60 in lower section 10. The lower end of the brake shoe A contacts the spring-pressed plunger 65 and the opposite end of flange B of shoe A is thereby forced into abutment with the opposite end wall of the flange cavity. The mold is then closed by means of the hydraulic press and the mold sections 10 and 20 held forced together with a very large total force which clamps the marginal portions of flange B between the mold sections, as described above, but does not force the web portion C against the bottom of its recess 60. The plastic friction compound is then injected under a very high injection pressure into the lining cavity 30 thru the passages 40 and 42 until said cavity is completely filled and the injected material is highly compacted directly against the outer face of flange B. The high injection pressure within cavity 30 cannot bend, warp, or otherwise distort flange B because flange B is rigidly backed up by the heavy rigid portions 33 of mold section 10. Also the lining material will be substantially sealed against flowing around the edges of flange B into the space about the loose-fitting web C because the margins of flange B are clamped tightly between the overlapping portions 32 of the upper section 20 and the lower section 10, as described above. The lateral walls of lining cavity 30 are preferably inwardly inclined throughout the length of said cavity, as shown in Fig. 4, so that the highly compacted material of the molded lining will be more easily freed from the upper section 20 when the mold sections are separated. The outer face of flange B is coated with a thin coating of uncured thermosetting resin or other suitable cement prior to being inserted in the mold so that the highly compacted lining material will adhere to flange B and will not be pulled loose therefrom when the mold is opened. The inclination of a substantial portion of the length of curved flange B relative to the vertical movement of the mold sections, as viewed in Fig. 1, also materially aids in causing the molded lining to adhere to flange B rather than to the upper mold section when the mold sections are separated.

Figure 8:
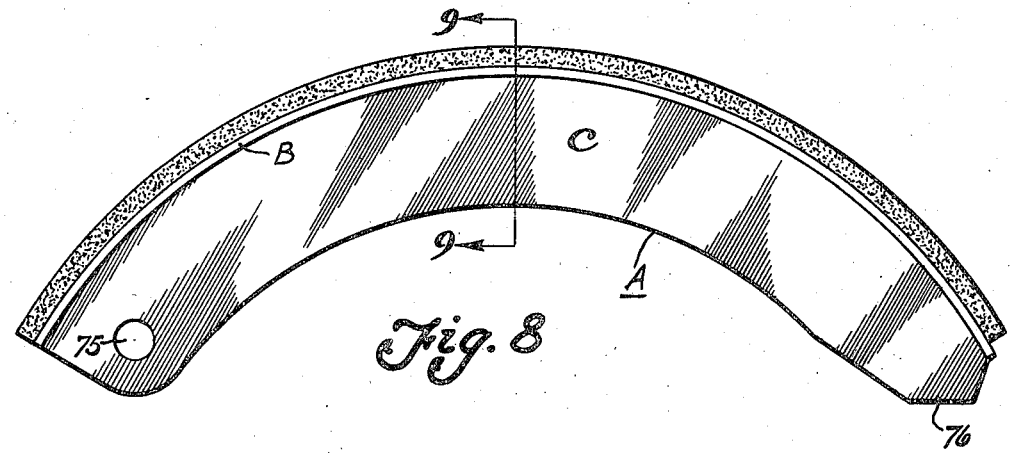
Fig. 8 is a side elevation of the brake shoe and attached lining as it comes from the mold.
Figure 9:
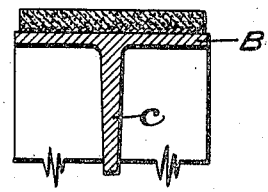
Fig. 9 is a section on line 9—9 of Fig. 8.

After the molding operation is completed, the two mold sections are separated and the brake shoe with the molded lining adhering thereto are ejected from lower mold section 10 by means of suitable knock-out pins. The drawings illustrate a vertical knock-out pin 61 which engages the bottom edge of web C of the brake shoe. Knock-out pin 61 is cammed upwardly by inclined surface 62 on the inner end of the horizontally sliding pin 63 whose outer end 64 projects laterally beyond the side of the lower mold section and is adapted to receive a blow as by a hammer. The brake shoe and lining assembly as it comes from the mold is shown in Figs. 8 and 9. The molded lining still contains its volatile solvent ingredient at this stage.

Figure 7:
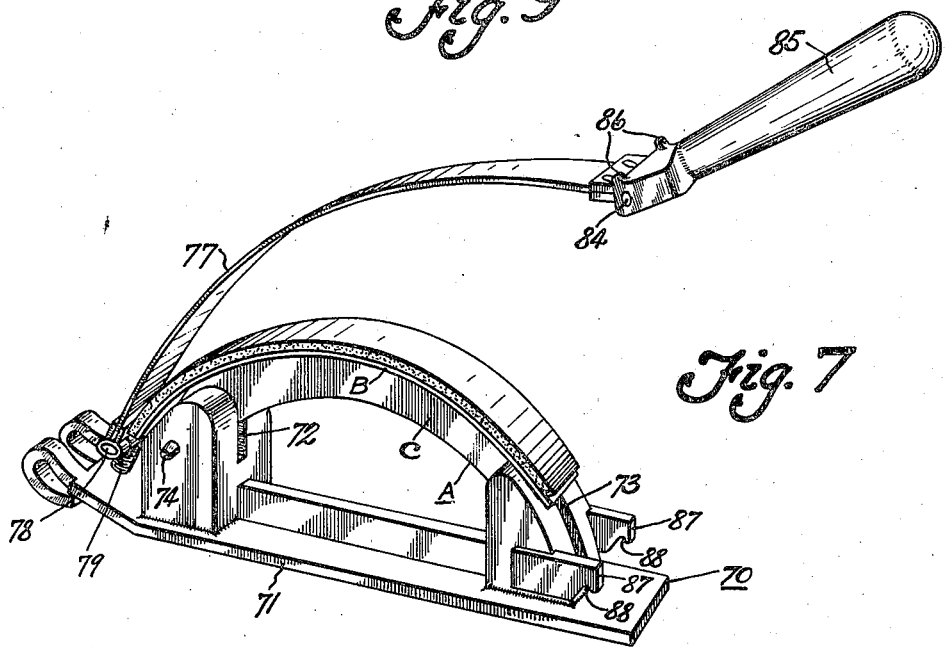

In the next operation the solvent ingredient is evaporated from the molded lining at such a moderate temperature as will not cause the thermosetting binder ingredient therein to set up and stiffen due to partial curing. As the solvent ingredient is evaporated therefrom the molded lining would become less dense or somewhat porous unless proper steps be taken to prevent such porosity and loss in density. According to this invention this porosity problem has been overcome by maintaining the still somewhat plastic molded lining under a follow-up compacting force while the solvent ingredient is being evaporated under conditions which will not partially cure the thermosetting binder in the lining. Thus, as the solvent is evaporated tending to leave voids the molded lining retains its somewhat soft and plastic nature and is progressively reduced in thickness by the compacting force to fill in the voids which would otherwise result. Figs. 5, 6 and 7 illustrate such a portable compacting means for maintaining a follow-up compacting force upon the molding lining during the evaporation of the solvent.

In Fig. 7 the brake shoe and lining assembly is shown inserted in place in the base 71 of the clamping fixture 70. The brake shoe A is located in fixture 70 simply by inserting the two ends of its web portion C into corresponding slots 72 and 73 in base 71 and then laterally inserting pin 74 which passes thru hole 75 in web portion C. The opposite end 76 of web portion C rests solidly upon the bottom of slot 73 (see Fig. 5). A flexible steel band 77 is hinged at pin 78 to fitting 79 whose shank 80 slides in a hole in the projecting end of base 71. A strong dished disk spring 81 interposed between nut 82 and base 71 provides a spring-tensioned take-up between steel band 77 and base 71. When steel band 77 is put under high tension the disk spring 81 will be forced to flatten out, as shown in full lines in Fig. 5, and thereafter will serve to maintain the high tension in band 77 and so compact the lining progressively as the volatile solvent evaporates. Now with the parts in the position shown in Fig. 7, the handle 85, which is hinged to steel band 77 by pin 84, may be forced down until the two projecting lugs 86 on said handle can be hooked under their cooperating projections 87 on base 71. Handle 85 is then swung down by hand from a substantial vertical position to the horizontal position shown in Figs. 5 and 6. During such swinging of handle 85 hinge pin 84 is forced downwardly with a greatly multiplied force by the leverage action of lugs 86 fulcruming in their cooperating stationary notches 88 in projections 87, and this will put a very high tension on steel band 77, which in turn will cause the above-mentioned disk spring 81 to flatten out. Thus the molded lining is highly compacted under a uniformly distributed follow-up force thruout its length. The solvent ingredient in the molded lining is evaporated therefrom at a moderate temperature, as described above, while said lining is maintained highly compacted by the portable clamping fixture 70. As the solvent is evaporated the thickness of the still plastic lining is reduced by the compacting pressure of steel band 77 and thus the desired lining density is obtained. The portable assembly shown in Figs. 5 and 6 is preferably passed thru a suitable electrical high-frequency heating unit to provide uniform heating of the molded lining and to thereby fully evaporate the solvent without partially curing the thermosetting binder therein.

After the lining has been freed of said solvent, the portable assembly of Figs. 5 and 6 is subjected to a curing temperature for a sufficient time period to set up the thermosetting binder ingredient until the linings are cured under pressure to the desired degree of hardness and rigidity. A typical cure is three hours at 400° F., but of course this temperature and time period may be varied considerably dependent upon the particular lining compound being used and the final degree of hardness desired in any case. Simultaneously with the curing of the lining, the above-mentioned thin coating of thermosetting resin originally applied to the outer face of flange B is also cured in pressure contact with the lining material and is thereby integrated therewith so as to provide a strong bond between flange B and the final cured lining. After the lining is cured to the desired degree, the brake shoe with the lining now strongly bonded thereto is removed from the clamping fixture 70. The outer surface of the rigid curved lining may then be accurately ground down to the desired outer diameter and provide a good friction surface thereon.

If so desired, molded brake linings separate from the metal shoe may be made by similarly injecting a plastic friction compound containing a volatile solvent to increase its flowing characteristics directly into a curved lining cavity of a suitable mold substantially according to the above description with the exception that the mold does not accommodate the brake shoe as an insert therein. In such a case, the lining is first molded in its curved form, removed from the mold and then tightly clamped in a follow-up clamping fixture while the solvent is being evaporated from the molded lining at a moderate temperature which does not partially cure the lining. As the solvent evaporates the molded lining is progressively compressed to reduce its thickness and provide the desired final density. Thereafter the lining is cured to the desired hardness and rigidity preferably while still clamped within the clamping fixture, all as described hereinabove. Such a molded brake lining may be later fixed to the metal brake shoe by any well-known means.

In practicing this invention it is important to use only sufficient volatile solvents in the thermosetting friction compound to give the necessary flowing characteristics to properly fill the mold cavity when subjected to a very high injection pressure of the order of 15,000 lbs. to 30,000 lbs. per sq. in. When only ordinary injection pressures are used a much higher percentage of solvents must be added to the injected compound and this will in turn result in the final lining having such low density and hardness as will not meet the required specifications for automotive brake linings.

A typical brake lining compound and the amount of volatile solvent mixed therewith for use with the above described method are as follows:

|   | Pounds |
|---|---|
| 1. Short asbestos fiber | 71 |
| 2. Gilsonite (in powder form) | 2 |
| 3. Barium sulphate | 5 |
| 4. Heat-resisting friction powder (derived from cashew shell oil) | 8 |
| 5. Oil-modified liquid thermosetting resin | 23 |
|   | 109 |

When only about one and a half gallons of gasoline is thoroughly mixed into the above compound as the volatile solvent therefor a typical injection pressure to be used therewith is 15,000 lbs. per sq. in. When only about three-quarters of a gallon of gasoline is used as the volatile solvent in the above compound a typical injection pressure is 30,000 lbs. per sq. in.

While the embodiment of the present invention as herein disclosed, constitutes a preferred form, it is to be understood that other forms might be adopted, all coming within the scope of the claims which follow.

What is claimed is as follows:

1. The steps in the method of lining the face of the curved metal flange of a brake shoe with a heat-resisting fibrous friction lining bonded to said metal flange, comprising: locating the brake shoe within the mold cavity of a divided mold so that said flange is very rigidly backed up and supported by the mold and forms a non-yielding confining wall for that portion of the mold cavity wherein the lining is to be molded, closing the mold and maintaining the mold closed with a high force sufficient to withstand the internal pressure within the lining cavity, injecting a thermosetting fibrous plastic compound containing a volatile solvent into the lining cavity under a very high pressure of the order of 15,000 lbs. per sq. inch to completely fill and then highly compact said plastic compound within the lining cavity and to cause the thus-molded friction lining to adhere to said curved metal flange when the mold is opened, then opening the divided mold and removing therefrom the thus-formed unit of brake shoe and molded lining, then clamping the molded lining tightly against said curved flange with a follow-up substantially uniformly distributed radial pressure, then heating said molded lining at a moderate temperature below the curing temperature thereof to evaporate said volatile solvent therefrom, and subsequently curing said lining at a curing temperature therefor.

2. The steps in the method of lining the face of the curved metal flange of a brake shoe with a heat-resisting fibrous friction lining bonded to said metal flange, comprising: providing a thin dry coating of uncured thermosetting resin on said curved metal face, locating the brake shoe within the mold cavity of a divided mold so that said flange is rigidly backed up and supported by the mold and forms a non-yielding confining wall for that portion of the mold cavity wherein the lining is to be molded, maintaining the mold closed with a high force sufficient to withstand the internal pressure within the lining cavity, injecting a thermosetting fibrous plastic compound containing sufficient volatile solvent to render it extrudable into the lining cavity with such a very high injection pressure as to highly compact said plastic compound within the lining cavity and to cause the thus-molded friction lining to adhere to said coated metal flange when the mold is opened, opening the divided mold and removing therefrom the thus-formed unit of brake shoe and molded lining, tightly clamping the molded lining against said curved flange with a follow-up substantially uniformly distributed radial pressure, then heating said molded lining at a moderate temperature below the curing temperature thereof until said volatile solvent is removed by evaporation, and subsequently curing and hardening said lining at a curing temperature.

3. The steps in the method of lining the face of the curved metal flange of a brake shoe with a heat-resisting fibrous friction lining strongly bonded to said metal flange, comprising: coating said curved metal face with a dry coating of uncured thermosetting resin, locating the brake shoe within the mold cavity of a divided mold so that said flange is rigidly backed up and supported by the mold and forms a non-yielding confining wall for that portion of the mold cavity wherein the lining is to be molded, then injecting a thermosetting plastic friction compound containing a volatile solvent into the lining cavity thru an injection aperture leading therein to fill said lining cavity with said plastic compound and thereafter compact said compound under such a high pressure directly against said resin-coated surface of said flange as to cause it to be cemented thereto, then drying under a moderate temperature below the curing temperature thereof said molded lining to free it of said volatile solvent while said lining is maintained radially compacted against the curved metal flange of the brake shoe with a follow-up uniformly distributed compacting force, and subsequently curing and hardening said lining under heat and pressure.

4. The steps in the method of lining a metal brake shoe with a heat-resisting molded friction lining, comprising: coating the metal surface to be lined with a dry coating of uncured thermosetting resin, then rigidly supporting the brake shoe within an injection mold so that the resin-coated surface of the shoe to which the lining is to be applied forms a non-yielding confining wall of the mold cavity wherein the lining is to be molded, then injecting under high pressure a plastic thermosetting friction compound containing a volatile solvent into the mold cavity thru an injection aperture to first completely fill said mold cavity and highly compact said plastic compound directly against the resin-coated surface of the shoe and cause the thus-molded lining to be cemented to said resin coating on said shoe, removing the thus formed unit of shoe and lining from the mold, evaporating said volatile solvent from the lining while said lining is maintained compressed in situ against said shoe at a temperature below the setting-up temperature of said thermosetting compound, and subsequently curing said lining under heat and pressure.

5. The steps in the method of providing a metal brake shoe with a high-temperature-resisting friction lining bonded thereto, comprising: coating the metal surface to which the lining is to be bonded with a dry adhering coating of uncured thermosetting resin, supporting the shoe in the cavity of a divided injection mold so that the resin-coated surface thereof forms a non-yielding confining wall for that portion of the cavity which receives the lining compound, closing the divided mold, maintaining said mold closed by a hydraulic press while simultaneously injecting a plastic fibrous thermosetting friction compound to fill said cavity, then maintaining a high injection pressure upon the injected material for a relative short time period to cause the thus-molded friction lining to more strongly adhere to said resin coating, then removing the thus-formed unit of the shoe and molded lining from the injection mold and clamping said molded lining against said shoe with a uniformly distributed follow-up pressure, heating said clamped-together assembly of shoe and lining for a period of the order of several hours at a temperature insufficient to cause a setting-up of the thermosetting friction compound in said lining, then subjecting said clamped-together assembly to a substantially higher temperature for such a time period as will cure said thermosetting friction compound to the desired degree of rigidity and hardness.

CHARLES H. BEARE.

REFERENCES CITED

The following references are of record in the file of this patent:

UNITED STATES PATENTS

| Number | Name | Date |
|---|---|---|
| 1,785,391 | Russell | Dec. 16, 1930 |
| 1,950,977 | Evans | Mar. 13, 1934 |
| 2,131,319 | Greenholtz et al. | Sept. 27, 1938 |
| 2,185,333 | Denman | Jan. 2, 1940 |
| 2,197,465 | Brunetti | Apr. 16, 1940 |
| 2,276,143 | Bell | Mar. 10, 1942 |
| 2,356,585 | Hempel | Aug. 22, 1944 |
| 2,379,166 | Lucid | June 26, 1945 |